United States Patent Office 3,109,706
Patented Nov. 5, 1963

3,109,706
METHOD FOR PRODUCING SODIUM PERBORATE
Emile Leblon and Henri Lambert, Brussels, Belgium, assignors to Solvay & Cie, Brussels, Belgium, a Belgian company
No Drawing. Filed Nov. 1, 1960, Ser. No. 66,398
Claims priority, application France Dec. 7, 1959
6 Claims. (Cl. 23—60)

The present addition relates to an improved process for the production of sodium perborate enabling solid products to be obtained which possess a slightly increased apparent density, an excellent mobility in the dry state and an improved dissolving speed in water.

In the parent application Ser. No. 807,255 of April 17, 1959, we have already described a stabilized solid sodium perborate obtained in the form of small porous spheres having a smooth or rough surface; it is distinguished from known products by a high mobility in the dry state, an apparent density between 0.25 and 0.50 kg./dm.$^3$ and a controllable granulometry which is relatively little extended.

The process for the production of this sodium perborate consists in placing a sodium metaborate solution in contact with a hydrogen peroxide solution in the presence of at least one of the constituents of the stabilizer, the reaction medium being stirred continuously and not vigorously, and in carrying out the precipitation of the perborate at a temperature between 0 and 15° C. from a solution in which the relative oversaturation of perborate, expressed by the relation between the weight of perborate virtually present in the solution and the weight of perborate normally soluble in water at 20° C., is comprised between 4 and 12.

According to one modification of the process, one of the constituents of the stabilizer is introduced into the hydrogen peroxide solution while the second constituent is introduced when the reagents have been mixed, prior to the precipitation of the sodium perborate.

However, the products obtained according to this process have the disadvantage of dissolving fairly slowly in water.

We have found that it is possible to improve substantially the dissolving speed in water of sodium perborates obtained according to this process without impairing the other important characteristics, particularly the crystalline appearance, by working in the presence of a wetting agent and by introducing the second constituent of the stabilizer in the course of the precipitation of the sodium perborate or after precipitation.

The improved process which is the object of this addition consists therefore in placing a sodium metaborate solution in contact with a hydrogen peroxide solution containing one constituent of the stabilizer in the presence of a wetting agent, in stirring the reaction medium continuously and not vigorously, in provoking the precipitation of the sodium perborate at a temperature between 0 and 15° C. from a solution in which the relative oversaturation expressed by the relation between the weight of perborate virtually present in the solution and the perborate normally soluble in water at 20° C. is comprised between 4 and 12, the second constituent of the stabilizer not being introduced into the medium before at least part of the perborate has precipitated.

Of the wetting agents which are especially suitable for carrying out the process which is the object of the present addition there should be mentioned alkali metal salts of alkyl, aryl and alkylaryl sulphates and sulphonates, derivatives of polyoxypropylene glycol, derivatives of polyoxyalkenes, polyvinyl alcohols and alkyl-celluloses; it should be noted that numerous other wetting agents may also be used without departing from the scope of the invention.

As stabilizer there is preferably used the magnesium silicate formed by the reaction of magnesium chloride or sulphate with sodium silicate. Other known stabilizers may likewise be used, for example those formed by the reaction of an alkaline earth metal halide with an alkali metal silicate.

According to a preferred modification of the process forming the object of the addition, the alkaline earth metal halide and the wetting agent are introduced into the hydrogen peroxide solution, the sodium silicate not being added to the medium before at least part of the sodium perborate has precipitated.

The quality of the final product may be further improved with regard to its stability by the introduction of an additional amount of stabilizer into the medium, after precipitation of the sodium perborate, this addition being carried out by the simultaneous introduction of a suitable amount of each constituent of the stabilizer.

The presence of a wetting agent in the reaction medium substantially reduces the period during which the medium remains oversaturated with the resulting perborate: it is therefore expedient to cool the reaction medium rapidly and energetically so that the temperature is below 15° C. before the start and throughout the precipitation of the sodium perborate. For this purpose, the sodium metaborate solution is introduced into a hydrogen peroxide solution which has previously been cooled to 0–15° C. and the reaction medium is kept at this temperature by cooling throughout the precipitation of sodium perborate. For the same purpose, the introduction of the metaborate solution into the hydrogen peroxide solution should not proceed too slowly; in general, this operation should be carried out within less than ½ hour. It should be noted that if the perborate begins to precipitate at a temperature above 15° C., it tends to appear as small crystals which may agglomerate in the reactor.

The stirring of the reaction medium is advantageously carried out by means of a stirrer of the "anchor" type; care must be taken that stirring does not become tumultuous, since it has been observed that the reaction medium is preferably displaced in parallel sections. A peripheric stirring at the rate of 0.5 to 1.5 m./sec. will generally lead to satisfactory products.

The quantities of reagents to be used are essentially in the vicinity of stoichiometric quantities; however, a slight excess of any reagent may be employed.

The sodium metaborate solution may be prepared in advance by reacting caustic soda with borax, or also "in situ," i.e. in the reaction medium. This modification has however the disadvantage of leading to less stable products.

The invention forming the object of the present addition is explained in detail by means of the following examples which are given for the purpose of illustration and do not limit in any way the scope of the invention which is capable of numerous variations without departing from its scope.

In all the examples, the apparent specific weights of the perborates obtained have been determined according to a method corresponding to the standards ASTM D392–38 and B212–48 which has been disclosed in the parent application. The method for measuring the mobility of the perborates obtained is based on standard ASTM D392–38, likewise described in the parent application.

Since there are not special standards for measuring the dissolving speed of substances in water, we have carried out the following experiment which enables the various sodium perborates to be compared with one another.

Into a vessel of the "beaker" type of which the bottom and half of the lateral wall are blacked externally and in which a two-blade stirrer of 80 mm. diameter rotates, there is introduced 1 liter of water at 35° C. Subsequently, one gram of the product to be examined is placed in the water while stirring is continued and a chronograph is engaged simultaneously; the time is registered which elapses before the whole of the product has apparently dissolved. This time designates the dissolving speed.

EXAMPLE 1

Sodium perborate is prepared according to the process of the parent application, in order to have a basis for comparison enabling the improvement obtained by the present addition to be appreciated.

Into 984 g. of a solution containing 100 g./kg. of hydrogen peroxide and 2.47 g. of $MgCl_2.6H_2O$ per kilogram of hydrogen peroxide solution there is introduced, within 15 minutes, 1000 g. of a solution containing 190 g./kg. of sodium metaborate and 8.33 g. of a sodium silicate solution 36° Bé. per kilogram of hydrogen peroxide solution employed. The mixture is stirred by means of a stirrer of the "anchor" type rotating at 106 r.p.m. The reaction medium is brought to a temperature of 3° C. within 15 minutes. The precipitated perborate is separated from the mother liquors and dried. One gram of this perborate dissolves in 345 seconds.

EXAMPLE 2

The process is carried out as in Example 1, but without introducing sodium silicate into the sodium metaborate solution. One gram of this perborate dissolves in 185 seconds, but the perborate possesses only a moderate stability.

EXAMPLE 3

The process is carried out as in Example 2, but with the addition of a wetting agent to the hydrogen peroxide solution. With 1 g. of the wetting agent called "Teepol" per kg. of hydrogen peroxide solution and by maintaining the temperature of the reaction medium at 3° C., there is thus obtained a perborate having a dissolving speed of 90 to 120 seconds but of poor stability.

In the Examples 1 to 3, the stirrer used in the experiment for measuring the dissolving speed rotates at 153 r.p.m. Since for suspending the perborate, more violent stirring is necessary; the rotation speed is raised to 341 r.p.m. Thus, 1 g. of perborate produced according to Example 3, dissolves in 75 seconds.

EXAMPLE 4

The process is carried out as in Example 3 and, in order to improve the stability of the sodium perborate, 4.16 g. of sodium silicate solution 36° Bé. per kg. of hydrogen peroxide solution are added to the reaction medium, after precipitation of the perborate. The perborate has an improved stability and a dissolving speed of 105 seconds (stirring at 341 r.p.m.).

EXAMPLE 5

The process is carried out as in Example 4, but after the complete precipitation of the perborate, there is introduced an additional amount of 1.23 g. of $MgCl_2.6H_2O$ per kg. of hydrogen peroxide solution. In this way, the stability of the sodium perborate is further improved.

Table I summarises the various examples and permits comparison of the various perborates obtained.

Table II permits comparison of the results obtained by using wetting agents other than "Teepol." The experiments numbered 6 to 14 are carried out according to Example 4.

*Table I*

| Example | 1 | 2 | 3 | 3 | 4 | 5 |
|---|---|---|---|---|---|---|
| Stabilizer introduced prior to precipitation of perborate, g./kg. of $H_2O_2$ solution: | | | | | | |
| $MgCl_2.6H_2O$ in $H_2O_2$ solution | 2.47 | 2.47 | 2.47 | 2.47 | 2.47 | 2.47 |
| $Na_2SiO_3$, 36° Bé. in metaborate solution | 8.33 | | | | | |
| Stabilizer introduced after precipitation of perborate, g./kg. of $H_2O_2$: | | | | | | |
| $MgSiO_3$; $MgCl_2.6H_2O$ | | | | | | |
| $Na_2SiO_3$, 36° Bé | | | | | | 1.23 |
| $Na_2SiO_3$, 36° Bé | | | | | 4.16 | 4.16 |
| Wetting agent in $H_2O_2$ solutions, g./kg. of $H_2O_2$ solution | | | 1 | 1 | 1 | 1 |
| Dissolving speed in water—seconds—stirrer 153 r.p.m | 345 | 185 | 90–120 | | | |
| Dissolving speed in water—seconds—stirrer 341 r.p.m | | | | 75 | 105 | 105 |
| Stability of perborate, kg. of decomposed perborate/kg. of perborate employed: | | | | | | |
| After 6 hours at 40° C | 0.04 | 0.46 | 0.50 | 0.50 | | |
| After 3 hours at 60° C | | | 0.65 | 0.65 | 0.07 | 0.05 |
| Apparent specific weight, kg./dm.³ | 0.35 | 0.47 | 0.34 | 0.34 | 0.44 | 0.43 |
| Fluidity time in seconds | 5 | 4 | 6 | 6 | 4 | 4 |
| Granulometry—classified 0.71–0.25 mm., g./kg | 688 | 670 | 643 | 643 | 782 | 694 |

*Table II*

| Experiment No. | Emulsifier | | g./kg. sol. $H_2O_2$ | Dissolving speed in sec. (stirrer 341 r.p.m.) | Stability of perborate in kg. of decomposed perborate per kg. of perborate 3 hours at 60° C. | Apparent specific weight kg./dm.³ | Fluidity, seconds | Granulometry classified 0.71–0.25, g./kg. |
|---|---|---|---|---|---|---|---|---|
| | Type | Nature | | | | | | |
| 6 | Sipon L-20 | alkyl sulphate | 1 | 75 | 0.04 | 0.36 | 5 | 734 |
| 7 | Mersolat H-80 (solution at 210 g./kg. of solution) | alkyl sulphonate | 1 | 105 | 0.02 | 0.38 | 5 | 763 |
| 8 | Warolat KL | do | 1 | 90 | 0.06 | 0.43 | 4 | 807 |
| 9 | Nacconol (solution at 210 g./kg. of solution) | alkylaryl sulphonate | 1 | 120 | 0.08 | 0.43 | 4 | 766 |
| 10 | Sinnopon NT | do | 1 | 105 | 0.05 | 0.42 | 5 | 821 |
| 11 | Pluronic 64 | hydroxypropylene-glycol derivative | 1 | 135 | 0.08 | 0.45 | 4 | 803 |
| 12 | Mulgofene BC | polyhydroxyalkene derivative | 1 | 135 | 0.06 | 0.46 | 4 | 756 |
| 13 | Elvanol 72/60 | polyvinyl alcohol | 1 | 105 | 0.07 | 0.44 | 4 | 763 |
| 14 | Methocel (solution at 210 g./kg. of solution) | methylcellulose | 1 | 120 | 0.04 | 0.44 | 4 | 792 |

We claim:
1. A process for the production of a readily water-soluble perborate stabilized by an alkaline earth metal silicate which comprises placing a sodium metaborate solution in contact with a hydrogen peroxide solution containing an alkaline earth metal halide, stirring the reaction mixture continuously but not vigorously and precipitating the sodium perborate at a temperature between 0 and 15° C. from a solution in which the relative supersaturation, expressed by the relation between the weight of perborate virtually present in the solution and the weight of perborate normally soluble in water at 20° C., is comprised between 4 and 12, said alkaline earth metal silicate being produced in situ in said reaction mixture by the in situ reaction between said alkaline earth metal halide and sodium silicate, said sodium silicate being introduced into the reaction mixture only when at least a part of the sodium perborate has precipitated, and the reaction between the metaborate and the hydrogen peroxide being carried out in the presence of a wetting agent selected from the group consisting of an alkali metal salt of an alkyl sulphate, an alkyl sulphonate, an aryl sulphonate, an alkylaryl sulphonate, a polyoxypropylene glycol, a polyvinyl alcohol, a polyoxyalkene ethanol, and an alkyl cellulose.

2. Process according to claim 1, wherein the hydrogen peroxide solution is previously cooled to 0–15° C. and the reaction medium is kept at that temperature, until the precipitation of the sodium perborate is completed.

3. A process for the production of a readily water-soluble perborate stabilized by an alkaline earth metal silicate which comprises placing a sodium metaborate solution in contact with a hydrogen peroxide solution containing an alkaline earth metal halide, stirring the reaction mixture continuously but not vigorously and precipitating the sodium perborate at a temperature between 0 and 15° C. from a solution in which the relative supersaturation, expressed by the relation between the weight of perborate virtually present in the solution and the weight of perborate normally soluble in water at 20° C., is comprised between 4 and 12, said alkaline earth metal silicate being produced in situ in said reaction mixture by the in situ reaction between said alkaline earth metal halide and sodium silicate, said sodium silicate being introduced into the reaction mixture only when at least a part of the sodium perborate has precipitated, and the reaction between the metaborate and the hydrogen peroxide being carried out in the presence of a polyoxypropylene glycol.

4. A process for the production of a readily water-soluble perborate stabilized by an alkaline earth metal silicate which comprises placing a sodium metaborate solution in contact with a hydrogen peroxide solution containing an alkaline earth metal halide, stirring the reaction mixture continuously but not vigorously and precipitating the sodium perborate at a temperature between 0 and 15° C. from a solution in which the relative supersaturation, expressed by the relation between the weight of perborate virtually present in the solution and the weight of perborate normally soluble in water at 20° C., is comprised between 4 and 12, said alkaline earth metal silicate being produced in situ in said reaction mixture by the in situ reaction between said alkaline earth metal halide and sodium silicate, said sodium silicate being introduced into the reaction mixture only when at least a part of the sodium perborate has precipitated, and the reaction between the metaborate and the hydrogen peroxide being carried out in the presence of a polyvinyl alcohol.

5. A process for the production of a readily water-soluble perborate stabilized by an alkaline earth metal silicate which comprises placing a sodium metaborate solution in contact with a hydrogen peroxide solution containing an alkaline earth metal halide, stirring the reaction mixture continuously but not vigorously and precipitating the sodium perborate at a temperature between 0 and 15° C. from a solution in which the relative supersaturation, expressed by the relation between the weight of perborate virtually present in the solution and the weight of perborate normally soluble in water at 20° C., is comprised between 4 and 12, said alkaline earth metal silicate being produced in situ in said reaction mixture by the in situ reaction between said alkaline earth metal halide and sodium silicate, said sodium silicate being introduced into the reaction mixture only when at least a part of the sodium perborate has precipitated, and the reaction between the metaborate and the hydrogen peroxide being carried out in the presence of a polyoxyalkene ethanol.

6. A process for the production of a readily water-soluble perborate stabilized by an alkaline earth metal silicate which comprises placing a sodium metaborate solution in contact with a hydrogen peroxide solution containing an alkaline earth metal halide, stirring the reaction mixture continuously but not vigorously and precipitating the sodium perborate at a temperature between 0 and 15° C. from a solution in which the relative supersaturation, expressed by the relation between the weight of perborate virtually present in the solution and the weight of perborate normally soluble in water at 20° C., is comprised between 4 and 12, said alkaline earth metal silicate being produced in situ in said reaction mixture by the in situ reaction between said alkaline earth metal halide and sodium silicate, said sodium silicate being introduced into the reaction mixture only when at least a part of the sodium perborate has precipitated, and the reaction between the metaborate and the hydrogen peroxide being carried out in the presence of an alkyl cellulose.

References Cited in the file of this patent

UNITED STATES PATENTS

| | | |
|---|---|---|
| 2,254,434 | Lind et al. | Sept. 2, 1941 |
| 2,863,835 | Goldsmith et al. | Dec. 9, 1958 |
| 2,937,998 | Habernickel | May 24, 1960 |
| 2,947,602 | Youngman et al. | Aug. 2, 1960 |
| 2,979,464 | Pistor | Apr. 11, 1961 |
| 3,025,134 | Dege et al. | Mar. 13, 1962 |

FOREIGN PATENTS

| | | |
|---|---|---|
| 761,371 | Great Britain | Nov. 14, 1956 |